US009997063B2

(12) United States Patent
Kim

(10) Patent No.: US 9,997,063 B2
(45) Date of Patent: Jun. 12, 2018

(54) REMOTE CONTROLLER FOR VEHICLE AND METHOD FOR PROVIDING FUNCTION THEREOF

(71) Applicant: Hyundai Motor Company, Seoul (KR)

(72) Inventor: Dong Uk Kim, Incheon (KR)

(73) Assignee: Hyundai Motor Company, Seoul (KR)

( * ) Notice: Subject to any disclaimer, the term of this patent is extended or adjusted under 35 U.S.C. 154(b) by 0 days. days.

(21) Appl. No.: 15/249,751

(22) Filed: Aug. 29, 2016

(65) Prior Publication Data

US 2017/0140642 A1 May 18, 2017

(30) Foreign Application Priority Data

Nov. 12, 2015 (KR) ........................ 10-2015-0159127

(51) Int. Cl.
*G05B 11/01* (2006.01)
*G08C 17/02* (2006.01)

(52) U.S. Cl.
CPC ......... *G08C 17/02* (2013.01); *G08C 2201/91* (2013.01)

(58) Field of Classification Search
CPC . G08C 17/02; G08C 2201/30; G08C 2201/91
USPC ............. 340/12.53, 12.5, 12.22, 12.3, 854.4, 340/426.36, 5.61, 5.72, 5.64, 905; 701/2, 701/36, 45, 112, 409, 48, 31.4
See application file for complete search history.

(56) References Cited

U.S. PATENT DOCUMENTS

2007/0216517 A1* 9/2007 Kurpinski ............. B60R 25/245 340/5.72
2010/0253535 A1* 10/2010 Thomas ................. H04B 1/082 340/4.37
2010/0305779 A1* 12/2010 Hassan .................. G01C 17/38 701/2
2011/0086668 A1* 4/2011 Patel ...................... G08C 17/02 455/556.1
2012/0100806 A1* 4/2012 Hall ........................ B60R 25/24 455/41.2
2012/0280791 A1 11/2012 Kim
2013/0110318 A1* 5/2013 Colja ...................... H02J 7/042 701/2

FOREIGN PATENT DOCUMENTS

JP 2009-002111 A 1/2009
JP 2014-051809 A 3/2014
KR 2007-0062781 A 6/2007
KR 10-2012-0116563 A 10/2012
KR 10-1509596 B1 4/2015
KR 2015-0051427 A 5/2015

* cited by examiner

*Primary Examiner* — Dhaval Patel
(74) *Attorney, Agent, or Firm* — Mintz Levin Cohn Ferris Glovsky and Popeo, P.C.; Peter F. Corless

(57) ABSTRACT

A remote controller for a vehicle includes: a communication module in communication with an external device; and a processor coupled to the communication module and configured to determine whether the remote controller is positioned outside of the vehicle or is positioned inside of the vehicle through communication with the external device, to provide a first function set when the remote controller is positioned outside of the vehicle, and to provide a second function set when the remote controller is positioned inside of the vehicle.

14 Claims, 5 Drawing Sheets

REMOTE CONTROLLER FOR VEHICLE AND METHOD FOR PROVIDING FUNCTION THEREOF

CROSS-REFERENCE TO RELATED APPLICATION

This application claims the benefit of and priority to Korean Patent Application No. 10-2015-0159127, filed on Nov. 12, 2015 in the Korean Intellectual Property Office, the disclosure of which is incorporated herein in its entirety by reference.

TECHNICAL FIELD

The present disclosure relates generally to a remote controller for a vehicle and a method for providing various functions using the same.

BACKGROUND

Recently, a wide range of electronic technologies have been applied to vehicles. For instance, even though a driver does not directly operate a vehicle, a remote controller for the vehicle may control various functions of the vehicle, such as door locking, starting the ignition, and the like, even at long range.

However, the conventional remote controller for a vehicle provides limited functions, and provides the same functions regardless of a position or a state of the driver. In addition, since the functions provided by the remote controller are fixed, there is a problem that the functions provided by the remote controller may not be changed depending on the preference of a user.

SUMMARY

The present disclosure has been made to solve the above-mentioned problems occurring in the related art, while advantages achieved by the related art are maintained intact.

An aspect of the present disclosure provides a remote controller for a vehicle with various functions available to a user depending on a position of the remote controller or whether or not the remote controller is cradled. The remote controller also allows the user to change the functions depending on his or her own preferences.

The objects of the present disclosure are not limited to the above-mentioned objects, and other objects and advantages of the present disclosure can be appreciated by the following description and will be clearly described by the embodiments of the present disclosure. Further, it will be easily known that the objects and advantages of the present disclosure can be implemented by means shown in the appended claims and a combination thereof.

According to embodiments of the present disclosure, a remote controller for a vehicle includes: a communication module in communication with an external device; and a processor coupled to the communication module and configured to determine whether the remote controller is positioned outside of the vehicle or is positioned inside of the vehicle through communication with the external device, to provide a first function set when the remote controller is positioned outside of the vehicle, and to provide a second function set when the remote controller is positioned inside of the vehicle.

Furthermore, according to embodiments of the present disclosure, a method of controlling a remote controller for a vehicle includes: establishing communication with an external device; determining whether the remote controller is positioned outside of the vehicle or is positioned inside of the vehicle according to the communication with the external device; providing a first function set when the remote controller is positioned outside of the vehicle; and providing a second function set when the remote controller is positioned inside of the vehicle.

Furthermore, according to embodiments of the present disclosure, a non-transitory computer readable medium contains program instructions for controlling a remote controller for a vehicle that: establish communication with an external device; determine whether the remote controller is positioned outside of the vehicle or is positioned inside of the vehicle according to the communication with the external device; provide a first function set when the remote controller is positioned outside of the vehicle; and provide a second function set when the remote controller is positioned inside of the vehicle.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION OF THE EMBODIMENTS

Figure 1:
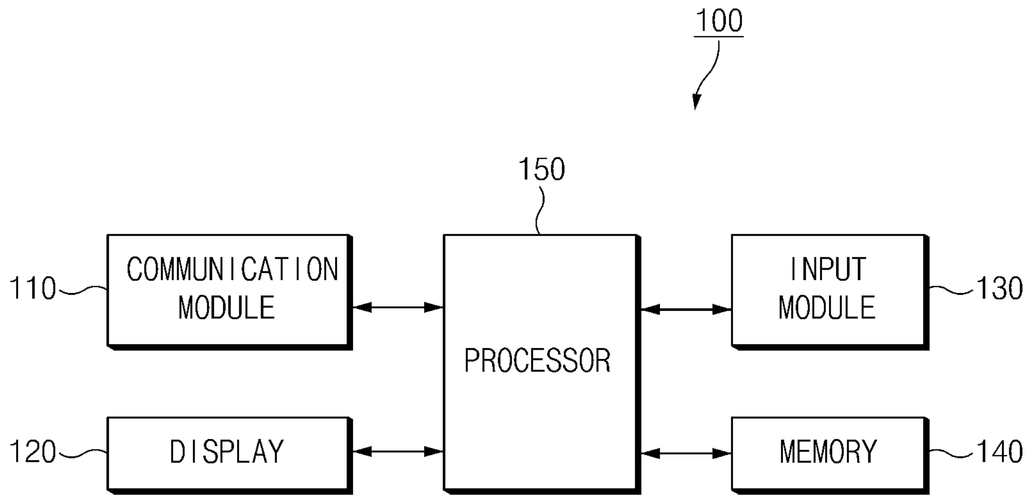
FIG. 1 is a block diagram illustrating a configuration of a remote controller according to embodiments of the present disclosure.

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms “a,” “an,” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof. As used herein, the term “and/or” includes any and all combinations of one or more of the associated listed items.

It is understood that the term “vehicle” or “vehicular” or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one processor. A memory is configured to store program instructions, and the processor is specifically programmed to execute the program instructions to perform one or more processes which are described further below. Moreover, it is understood that the below methods may be executed by an apparatus comprising the at least one processor in conjunction with one or more other components, as would be appreciated by a person of ordinary skill in the art.

Furthermore, the processor of the present disclosure may be embodied as non-transitory computer readable media containing executable program instructions executed by the processor. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Embodiments of the present disclosure will now be described in detail with reference to the accompanying drawings.

FIG. 1 is a block diagram illustrating a configuration of a remote controller according to embodiments of the present disclosure.

As shown in FIG. 1, a remote controller 100 may include a communication module 110, a display 120, an input module 130, a memory 140, and a processor 150. The remote controller 100 according to embodiments of the present disclosure may provide various function sets depending on a position or a state of the remote controller 100.

According to embodiments of the present disclosure, the communication module 110 may communicate with an external device. For example, the communication module 110 may communicate with a controller mounted in a door or a trunk of a vehicle, an audio, video, and navigation (AVN) device, a user terminal such as a smartphone, a wearable device, or the like.

The communication module 110 may include a radio frequency (RF) module, a low frequency (LF) module, a Bluetooth module, a wireless-fidelity (Wi-Fi) module, or the like. The remote controller 100 may communicate with the external device through at least one of the above-mentioned modules. For example, the communication module 110 may perform LF communication with an LF communication device mounted inside or outside of the vehicle. As another example, the communication module 110 may perform RF communication with an RF communication device mounted in the door or the trunk of the vehicle. As still another example, the communication module 110 may be connected to the AVN or the user terminal through Bluetooth or Wi-Fi to perform communication.

The communication module 110 may receive vehicle state information or information related to media which are being played from the AVN device or the controller of the vehicle. For example, the processor 150 may receive a position of the vehicle, speed of the vehicle, a state of an air conditioner, navigation information, a music playlist, lyrics of the music which is being played, and the like, through the communication module 110.

The display 120 may display a user interface. More specifically, the display 120 may display an object corresponding to the function set selected by the processor 150. For example, the display 120 may display a function key corresponding to the selected function set. As another example, the display 120 may display the media received from the AVN device of the vehicle.

The display 120 may also include a plurality of displays. For example, the display 120 may include a first display and a second display. The first display may have a variable layout. For example, the first display may have different layouts depending on information displayed on the display.

Furthermore, the second display may have a stationary layout. For example, the second display may display the designated number of objects (e.g., function keys) having a designated size and a designated shape at a designated position.

The user interface displayed on the display 120 (e.g., the first display or the second display) will be described in more detail with reference to FIGS. 2A to 4.

The input module 130 (or a user input device) may receive (e.g., sense) a user input. The input module 130 may receive a user input that changes one or more functions included in a first function set, a second function set, and/or a third function set. The input module 130 may receive a user input that changes a layout of the user interface displayed on the display 120 (e.g., the first display or the second display). The input module 130 may receive user input that selects one of the functions provided by the remote controller 100. The input module 130 may include a touch sensor panel sensing a touch operation of the user. The input module 130 may also include one or more buttons corresponding to the functions provided by the remote controller 100.

The display 120 and the input module 130 may also be implemented, for example, as a touch screen having an input panel disposed on a display panel to simultaneously perform the display and the sensing of the touch operation.

The memory 140 may store information associated with the first function set, the second function set, or the third function set. For example, the memory 140 may store the functions stored in the respective function sets. For instance, the memory 140 may store the layout of the display 120 or at least one of a kind, a shape, the number, and a position of the object (or information) to be displayed on the display 120.

The processor 150 may control a general operation of the remote controller 100. For example, the processor 150 may control each of the communication module 110, the display 120, the input module 130, and the memory 140 to provide various functions to the user according to the embodiments of the present disclosure. The processor 150 (e.g., a micro-controller) may be implemented as a system on chip (SoC) including a central processing unit (CPU), a graphic processing unit (GPU), a memory, or the like.

The processor 150 may determine the position of the remote controller 100 using information received from the external device through the communication module 110. For example, if the communication module 110 receives a signal from the LF module positioned inside of the vehicle (e.g., a center fascia or console), the processor 150 may determine that the remote controller 100 is positioned inside of the vehicle. As another example, if the communication module 110 receives the signal from the LF module positioned outside of the vehicle or no LF signal is received, the processor 150 may determine that the remote controller 100 is positioned outside of the vehicle.

Notably, the processor 150 may provide different functions depending on the position of the remote controller 100. For instance, if the remote controller 100 is positioned outside of the vehicle, the processor 150 may provide the first function set. For example, if the remote controller 100 is positioned outside of the vehicle, the processor 150 may provide at least some of functions included in the first function set. Alternatively, if the remote controller 100 is positioned inside of the vehicle, the processor 150 may provide the second function set. For example, if the remote controller 100 is positioned inside of the vehicle, the processor 150 may provide at least some of functions included in the second function set.

Each of the first function set and the second function set may include at least one function. Also, the first function set and the second function set may include one or more different functions. For example, some of the functions included in the first function set and the functions included in the second function set can be the same as each other, while the remaining functions may be different from each other. As another example, the first function set and the second function set may include only functions different from each other. The first function set may include, for example, at least one function of: a trunk opening, a door opening and closing, a vehicle starting control, an air conditioner control, a vehicle position display, and a vehicle state display. The second function set may include, for example, at least one function of: a display of media which is being played in the vehicle, a media control, a navigation control, an air conditioner control, and a vehicle state display.

If it is determined that the remote controller 100 is positioned inside of the vehicle, the processor 150 may determine whether the remote controller 100 is cradled. For example, the processor 150 may determine whether or not the remote controller 100 is cradled in (or coupled to) a designated cradle. If a designated signal is received from the cradle through the communication module, the processor 150 may determine that the remote controller 100 is cradled in the cradle. As another example, the remote controller 100 may include a button or a pressure sensor (not illustrated) operated by a coupling with the cradle. If the designated signal is received from the button or the pressure sensor by the coupling with the cradle, the processor 150 may determine that the remote controller 100 is cradled in the cradle.

If it is determined that the remote controller 100 is cradled, the processor 150 may provide the third function set. The third function set may include, for example, at least one function, and the first function set and the second function set may include different one or more functions.

Figure 2A:
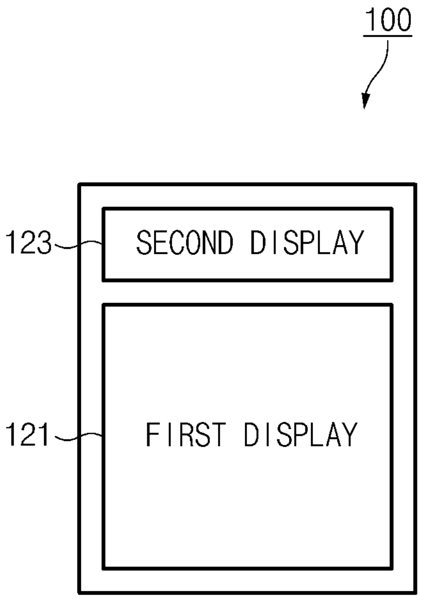
FIGS. 2A and 2B are diagrams illustrating a structure of the remote controller according to embodiments of the present disclosure.
Figure 2B:
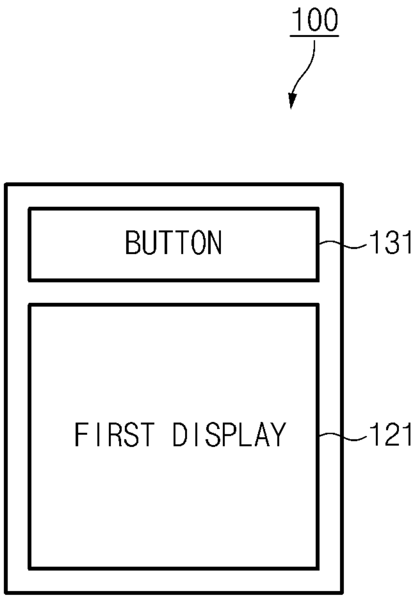

FIGS. 2A and 2B are diagrams illustrating a structure of the remote controller according to embodiments of the present disclosure.

As shown in FIG. 2A, the remote controller 100 may include a first display 121 and a second display 123. The first display 121 and the second display 123 may display different user interfaces depending on the position of the remote controller 100. For example, the first display 121 and the second display 123 may display a user interface corresponding to the first function set when the remote controller 100 is positioned outside of the vehicle, and display a user interface corresponding to the second function set when the remote controller 100 is positioned inside of the vehicle.

As shown in FIG. 2B, the remote controller 100 may include the first display 121 and at least one button 131. At least one button 131 may provide a designated function (e.g., a trunk opening, a door opening or closing, a vehicle starting control, or the like), regardless of the position of the remote controller 100. Here, the first display 121 may display different user interfaces depending on the position of the remote controller 100. For example, the first display 121 may display the user interface corresponding to the first function set when the remote controller 100 is positioned outside of the vehicle, and may display the user interface corresponding to the second function set when the remote controller 100 is positioned inside of the vehicle.

Figure 3B:
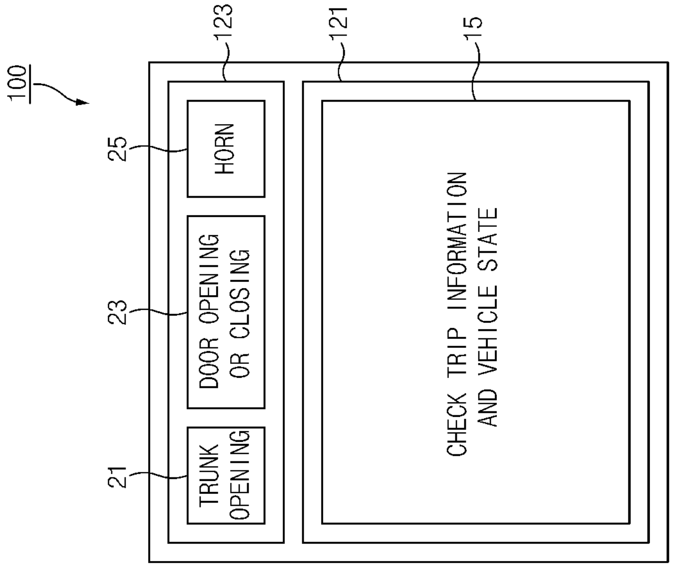
FIGS. 3A and 3B are diagrams illustrating a user interface according to embodiments of the present disclosure.
Figure 3A:
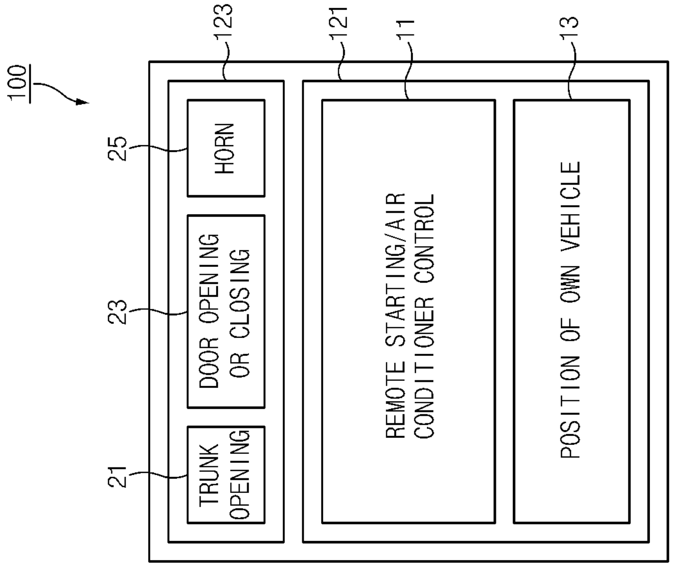

FIGS. 3A and 3B are diagrams illustrating a user interface according to embodiments of the present disclosure.

As shown in FIGS. 3A and 3B, the remote controller 100 may include the first display 121 and the second display 123. If it is determined that the remote controller 100 is positioned outside of the vehicle, the processor 150 may display the user interface corresponding to the first function set The processor 150 may display objects (or information) corresponding to some of the functions included in the first function set on the first display 121, and may display objects (or information) corresponding to other functions included in the first function set on the second display 123. For example, the processor 150 may display an object 11 for providing a remote starting or air conditioner control function and an object 13 for providing a position display function of the vehicle on the first display 121. Further, the processor 150 may display an object 21 for providing a trunk opening function, an object 23 for providing a door opening or closing function, and an object 25 for providing a horn function on the second display 123.

The processor 150 may change the user interface displayed on the first display 121 depending on the user input and may display the changed user interface. For example, if a flick or drag operation of the user is input to the first display 121 in a state in which the user interface is displayed, as illustrated in FIG. 3A, an object (or information) corresponding to a function different from the function displayed on the first display 121 among the functions included in the first function set may be displayed. As shown in FIG. 3B, the processor 150 may display an object 15 for providing a vehicle trip information display function and a vehicle state (e.g., a door locking, whether or not the vehicle is started, or the like) information display function on the first display 121 in response to the user input.

The layout of the user interface displayed on the first display 121 may be changed depending on the user input. For example, comparing FIGS. 3A and 3B with each other, at least one of a shape, the number and a position of the object displayed on the first display 121 may be changed.

Figure 4A:
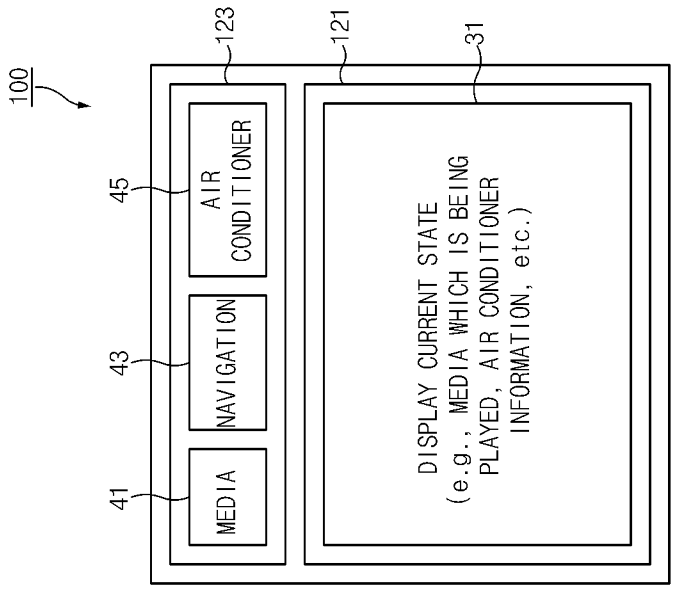
FIGS. 4A and 4B are diagrams illustrating a user interface according to embodiments of the present disclosure.
Figure 4B:
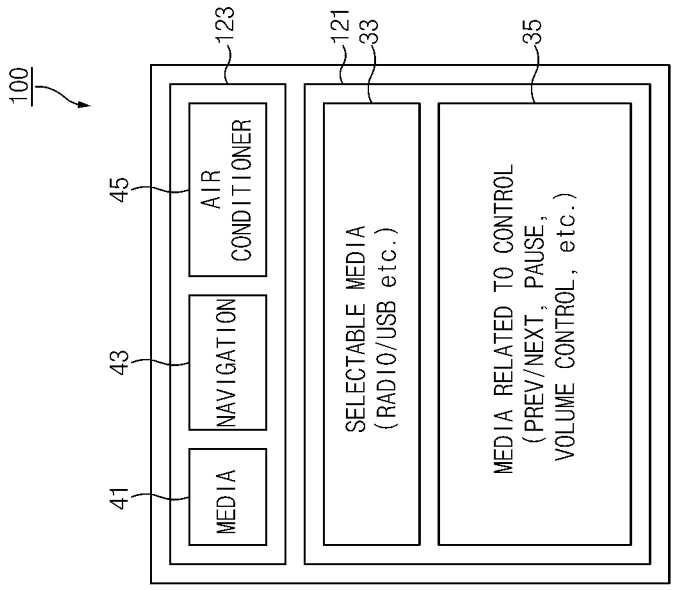

FIGS. 4A and 4B are diagrams illustrating a user interface according to embodiments of the present disclosure.

As shown in FIGS. 4A and 4B, the remote controller 100 may include the first display 121 and the second display 123. For instance, if it is determined that the remote controller 100 is positioned inside of the vehicle, the processor 150 may display the user interface corresponding to the second function set. Additionally, the processor 150 may display objects (or information) corresponding to some of the functions included in the second function set on the first display 121, and may display objects (or information) corresponding to other functions included in the second function set on the second display 123. For example, the processor 150 may display an object 31 for providing vehicle state (e.g., speed of the vehicle, a state of an air conditioner, a media which is being played, etc.) information on the second display 123. Further, the processor 150 may display an object 41 for controlling a media, an object 43 for providing a navigation function, and an object 45 for providing an air conditioner control function on the second display 123.

Further, the processor 150 may change the user interface displayed on the first display 121 or the second display 123 depending on the user input and may display the changed user interface. For example, if a user input selecting one of the objects displayed on the second display 123 is received in a state in which the user interface is displayed, as illustrated in FIG. 4A, an object (or information) for providing a detail function of the selected function may be displayed on the first display 121. As shown in FIG. 4B, if the user selects the object 41 for controlling the media, the processor 150 may display an object 33 for selecting a kind of media and an object 35 for controlling a play of the media on the first display 121.

The layout of the user interface displayed on the first display 121 or the second display 123 may be changed based on the user input. For example, comparing FIGS. 4A and 4B with each other, at least one of a shape, the number and a position of the object displayed on the first display 121 may be changed.

Also, the processor 150 may display the user interface on the first display 121 or the second display 123 depending on user setting information. For example, the user may change the layout of the first display 121 using a user terminal such as the input module 130 or the smartphone. As another example, the user may set at least one of a kind, a shape, the number, and a position of the objects (or information) to be displayed on the first display 121 or the second display 123 using the user terminal such as the input module 130 or the smartphone. In addition, the processor 150 may receive the user setting information from the user terminal through the communication module 110. The processor 150 may receive the user setting information for each of the function sets through the communication module 110. The processor 150 may store the user setting information in the memory 140.

The user may control the vehicle using the user interface displayed on the display 120 (e.g., the first display 121 or the second display 123). The processor 150 may transmit a control signal to the AVN device or the controller of the vehicle through the communication module 110 depending on the user input. For example, the communication module 110 may transmit a trunk opening signal, a door opening or closing signal, a vehicle starting on/off signal, a media control signal, and the like, to the controller of the vehicle.

Additionally, the user may set a locking for some of the functions provided by the remote controller 100. For example, in the case in which the user lends the remote controller to others, the user may set the locking for some functions of the remote controller. If a locking function is activated, the processor 150 may limit some functions set by the user. For example, the processor 150 may not display the functions in which the locking function is set on the display 120, or may display the functions in which the locking function is set differently from functions in which the locking function is not set (e.g., may display the functions in which the locking function is set in a gray tone). As another example, the processor 150 may not perform a corresponding function for the functions in which the locking function is set even though the user input is received.

According to the embodiments described above, while it is described that the second display 123 has the stationary layout, the second display 123 may also be implemented to have the variable layout similarly to the first display 121. In the case in which the second display 123 has the variable layout, for example, the user may change the layout of the second display 123 using the user terminal such as the input module 130 or the smartphone.

Figure 5:
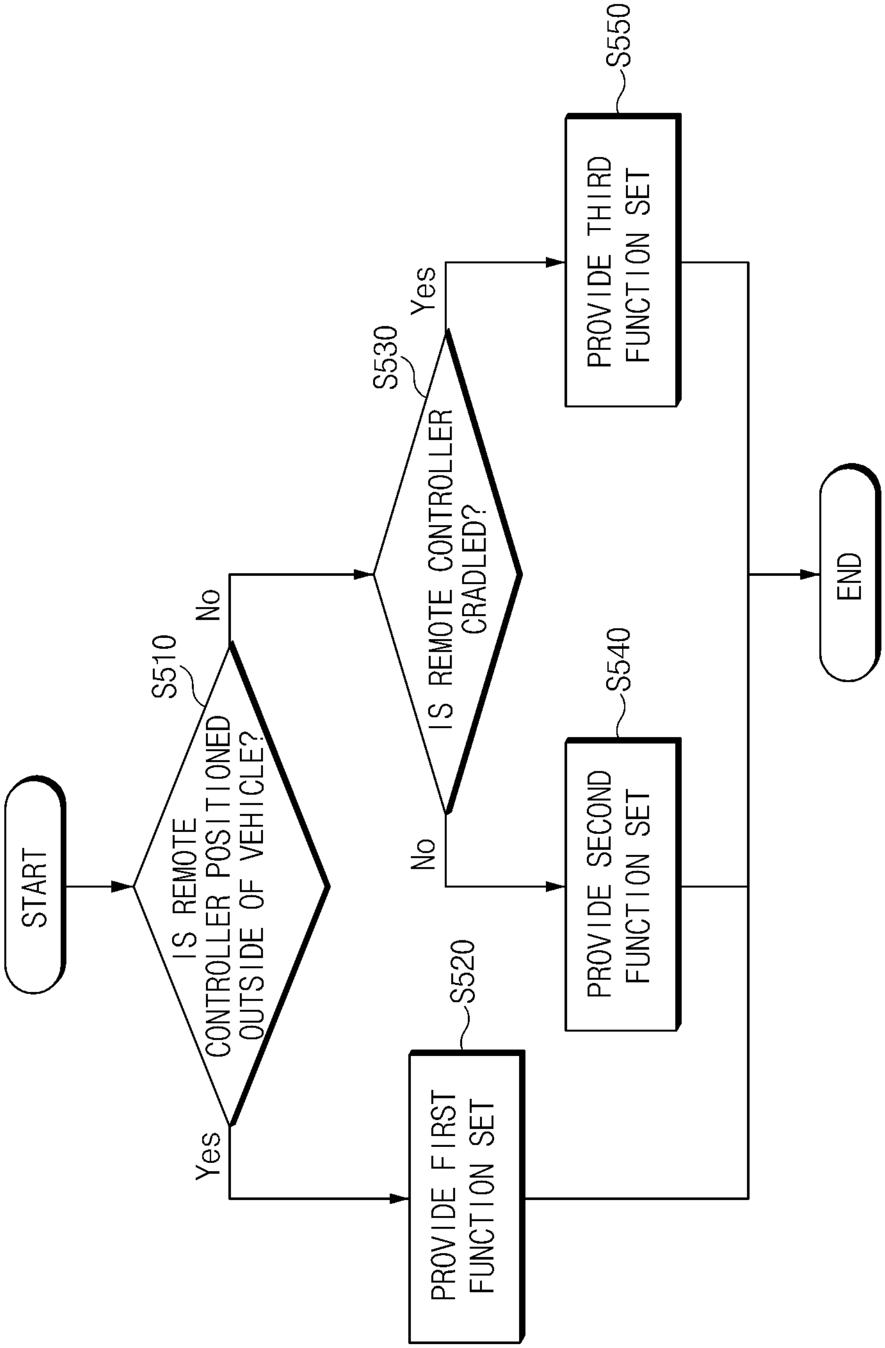
FIG. 5 is a flowchart illustrating a method for providing a function of a remote controller according to embodiments of the present disclosure.

FIG. 5 is a flowchart illustrating a method for providing a function of a remote controller according to embodiments of the present disclosure.

The flowchart illustrated in FIG. 5 may include operations processed by the remote controller 100 illustrated in FIG. 1. Accordingly, although being omitted hereinafter, the contents described with connection with the remote controller 100 with reference to FIGS. 1 to 4 may also be applied to the flowchart illustrated in FIG. 5.

As shown in FIG. 5, the remote controller 100 may determine whether or not the remote controller 100 is positioned outside of the vehicle (S510). For example, if the remote controller 100 receives a signal from an LF module positioned outside of the vehicle or no LF signal is received, the remote controller 100 may determine that the remote controller 100 is positioned outside of the vehicle. As another example, if the remote controller 100 receives a signal from the LF module positioned inside of the vehicle (e.g., a center fascia or console), the remote controller 100 may determine that the remote controller 100 is positioned inside of the vehicle.

In this regard, if the remote controller 100 is positioned outside of the vehicle (YES in S510), the remote controller 100 may provide a first function set (S520). For example, the remote controller 100 may display a user interface corresponding to the first function set on a first display having a variable layout and a second display having a stationary layout. The first function set may include, for example, at least one function of a trunk opening, a door opening and closing, a vehicle starting control, an air conditioner control, a vehicle position display, and a vehicle state display. The remote controller 100 may display the user interface corresponding to the first function set on the first display based on user setting information received through a communication module.

Alternatively, if the remote controller 100 is not positioned outside of the vehicle (or is positioned inside of the vehicle) (NO in S510), the remote controller 100 may determine whether or not the remote controller is cradled (S530). For example, the remote controller 100 may determine whether or not the remote controller 100 is cradled in (or coupled to) a designated cradle. Also, if a designated signal is received from a cradle through the communication module or the designated signal is received from a button or a pressure sensor by the coupling with the cradle, the remote controller 100 may determine that the remote controller 100 is cradled in the cradle.

If it is determined that the remote controller 100 is not cradled (NO in S530), the remote controller 100 may provide a second function set (S540). For example, the remote controller 100 may display a user interface corresponding to the second function set on a first display having a variable layout and a second display having a stationary layout. The second function set may include, for example, at least one function of a display of media which is being played in the vehicle, a media control, a navigation control, an air conditioner control, and a vehicle state display. The first function set and the second function set may include one or more different functions. Also, the remote controller 100 may display the user interface corresponding to the second function set on the first display depending on user setting information received through a communication module.

If it is determined that the remote controller 100 is cradled (YES in S530), the remote controller 100 may provide a third function set (S550). For example, the remote controller 100 may display a user interface corresponding to the third function set on a first display having a variable layout and a second display having a stationary layout. The third function set may include, for example, at least one function, and the first function set and the second function set may include different one or more functions. The remote controller 100 may display the user interface corresponding to the third function set on the first display based on user setting information received through a communication module.

The remote controller 100 may change the user interface displayed on the first display 121 based on the user input and may display the changed user interface. For example, if a flick or drag operation of the user is input to the first display, the remote controller 100 may display an object (or information) corresponding to a function different from the function displayed on the first display. As another example, if a user input selecting one of the objects displayed on the second display is received, the remote controller 100 may display an object (or information) for providing a detail function of the selected function on the first display.

Additionally, if a locking function for some functions of the remote controller 100 is activated by the user, the remote controller 100 may limit some functions set by the user.

As described above, according to the embodiments of the present disclosure, the various functions of the remote controller may be provided to the user depending on the position of the remote controller or a situation of the user, and the functions provided by the remote controller can be changed based on such circumstances, thereby increasing the convenience of the user.

Hereinabove, although the present disclosure has been described with reference to embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A remote controller for a vehicle comprising:

a communication module in communication with an external device;

a processor coupled to the communication module and configured to determine whether the remote controller is positioned outside of the vehicle or is positioned inside of the vehicle through communication with the external device, to select a first function set when the remote controller is positioned outside of the vehicle, and to select a second function set when the remote controller is positioned inside of the vehicle;

a first display configured to have a variable layout; and a second display configured to have a stationary layout, wherein the layout of the first display changes in response to user input received at the second display, and the first display and the second display are configured to display a user interface corresponding to the first function set or the second function set selected by the processor.

2. The remote controller according to claim 1, wherein:

the first function set includes at least one function, and the second function set includes at least one function different from the at least one function of the first function set.

3. The remote controller according to claim 1, wherein:

the first function set includes at least one function of: a trunk opening, a door opening or closing, a vehicle starting control, an air conditioner control, a vehicle position display, and a vehicle state display, and the second function set includes at least one function of: a display of media which is being played in the vehicle, a media control, a navigation control, an air conditioner control, and a vehicle state display.

4. The remote controller according to claim 1, wherein the processor is further configured to display the user interface on the first display and the second display based on user setting information received through the communication module.

5. The remote controller according to claim 1, wherein the processor is further configured to change the user interface displayed on the first display or the second display in response to user input.

6. The remote controller according to claim 1, further comprising:

at least one button configured to select a designated function, wherein the processor is further configured to display a user interface corresponding to the first function set or the second function set on the first display.

7. The remote controller according to claim 1, wherein the processor is further configured to determine whether the remote controller is cradled and to provide a third function set when the remote controller is cradled.

8. A method of controlling a remote controller for a vehicle, the method comprising:

establishing communication with an external device;

determining whether the remote controller is positioned outside of the vehicle or is positioned inside of the vehicle according to the communication with the external device;

selecting a first function set when the remote controller is positioned outside of the vehicle;

selecting a second function set when the remote controller is positioned inside of the vehicle; and displaying a user interface corresponding to the selected first or second function set on a first display configured to have a variable layout and a second display configured to have a stationary layout, wherein the remote controller includes the first display and the second display, and the layout of the first display changes in response to user input received at the second display.

9. The method according to claim 8, wherein:

the first function set includes at least one function, and the second function set includes at least one function different from the at least one function of the first function set.

10. The method according to claim 8, wherein:

the first function set includes at least one function of: a trunk opening, a door opening or closing, a vehicle starting control, an air conditioner control, a vehicle position display, and a vehicle state display, and the second function set includes at least one function of: a display of media which is being played in the vehicle, a media control, a navigation control, an air conditioner control, and a vehicle state display.

11. The method according to claim 8, further comprising:

receiving user setting information through a communication module; and displaying the user interface on the first display and the second display based on the user setting information.

12. The method according to claim 8, further comprising:
receiving a user input through an input module; and
changing the user interface displayed on the first display or the second display in response to the user input.

13. The method according to claim 8, further comprising:
determining whether the remote controller is cradled; and
providing a third function set when the remote controller is cradled.

14. A non-transitory computer readable medium containing program instructions for controlling a remote controller for a vehicle, the computer readable medium comprising program instructions that:
establish communication with an external device;
determine whether the remote controller is positioned outside of the vehicle or is positioned inside of the vehicle according to the communication with the external device;
select a first function set when the remote controller is positioned outside of the vehicle;
select a second function set when the remote controller is positioned inside of the vehicle; and
display a user interface corresponding to the selected first or second function set on a first display configured to have a variable layout and a second display configured to have a stationary layout, wherein
the remote controller includes the first display and the second display, and
the layout of the first display changes in response to user input received at the second display.

* * * * *